(12) United States Patent
Jheng et al.

(10) Patent No.: US 12,355,268 B1
(45) Date of Patent: Jul. 8, 2025

(54) DETECTING METHOD AND POWER TRANSMITTER IN WIRELESS CHARGING SYSTEM

(71) Applicant: Delta Electronics, Inc., Taoyuan (TW)

(72) Inventors: You Jhih Jheng, Taoyuan (TW); Ri Long Lo, Taoyuan (TW); Zheng Bo Liang, Taoyuan (TW); Ta Lun Chang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 18/634,902

(22) Filed: Apr. 13, 2024

(30) Foreign Application Priority Data

Jan. 3, 2024 (CN) .......................... 202410009837.6

(51) Int. Cl.
*H02J 50/60* (2016.01)
*H02J 50/10* (2016.01)

(52) U.S. Cl.
CPC .............. *H02J 50/60* (2016.02); *H02J 50/10* (2016.02)

(58) Field of Classification Search
CPC ................................. H02J 50/60; H02J 50/10
See application file for complete search history.

(56) References Cited

U.S. PATENT DOCUMENTS

| | | | |
|---|---|---|---|
| 10,923,963 B2 | 2/2021 | Baek et al. | |
| 2009/0026844 A1* | 1/2009 | Iisaka | H02J 50/90 307/104 |
| 2015/0049833 A1* | 2/2015 | Noguchi | H04B 5/266 375/272 |
| 2020/0185974 A1* | 6/2020 | Chen | H02J 50/12 |
| 2025/0079908 A1* | 3/2025 | Bhandarkar | H02J 50/12 |

FOREIGN PATENT DOCUMENTS

| | | |
|---|---|---|
| CN | 108450042 A | 8/2018 |
| TW | 201415064 A | 4/2014 |
| TW | 202329582 A | 7/2023 |

* cited by examiner

*Primary Examiner* — Daniel Kessie
(74) *Attorney, Agent, or Firm* — Nathan & Associates Patent Agents Ltd.; Menachem Nathan (57) ABSTRACT

The embodiments of the present application provide a detecting method and a power transmitter in a wireless charging system. The power transmitter includes: a signal sampling circuit, configured to sample a signal generated by an oscillation circuit of the power transmitter; and a control circuit, coupled to the signal sampling circuit, configured to: obtain an oscillation waveform based on the obtained sampled values; perform an integral operation on the oscillation waveform and average the result of the integral operation to obtain an integrated average value; obtain a oscillation frequency of the oscillation waveform; and determine whether there is a foreign object or a power receiver approaching the power transmitter, based on the integrated average value and the oscillation frequency. The power transmitter can effectively improve the accuracy of determining whether there is a foreign object or a power receiver approaching the power transmitter.

20 Claims, 5 Drawing Sheets

DETECTING METHOD AND POWER TRANSMITTER IN WIRELESS CHARGING SYSTEM

CROSS REFERENCE TO RELATED APPLICATION

This application claims priority to China Patent Application No. 202410009837.6, filed on Jan. 3, 2024, which is incorporated herein by reference in its entirety.

TECHNICAL FIELD

Embodiments of the present application relate to a wireless charging system, and more particularly to a detecting method for detecting whether there is a foreign object or a power receiver approaching a power transmitter in a wireless charging system, and a power transmitter.

BACKGROUND

In wireless charging systems, a power transmitter (or TX) conveys electric energy to a power receiver (or RX) placed on or close to the power transmitter by electromagnetic waves to charge or supply power to the power receiver. In this process, a coil of the power transmitter has an oscillation frequency as the same as or similar to that of the coil of the power receiver such that they can be effectively coupled to each other. Energy can be effectively propagated therebetween even if they are separated by a certain distance or there is a non-metallic object placed therebetween.

If a metal object is placed close to the power transmitter and receiver during the power transmitter supplies power to the power receiver, the power transmitter, the power receiver and the metal object may be damaged by the heat generated by the metal object.

Figure 1A:
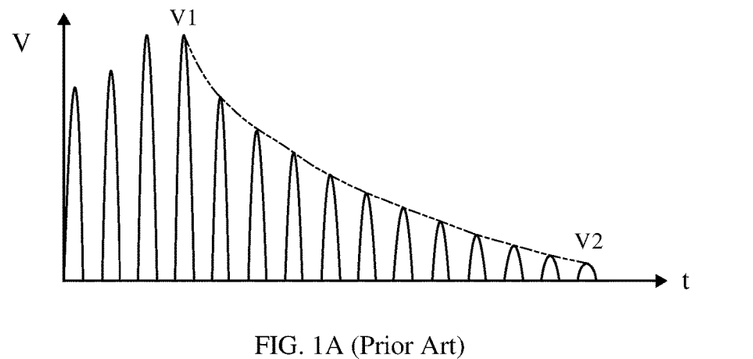
FIG. 1A is a schematic diagram illustrating an oscillation waveform of an oscillation circuit of a power transmitter resulted when there is no metal foreign object.
Figure 1B:
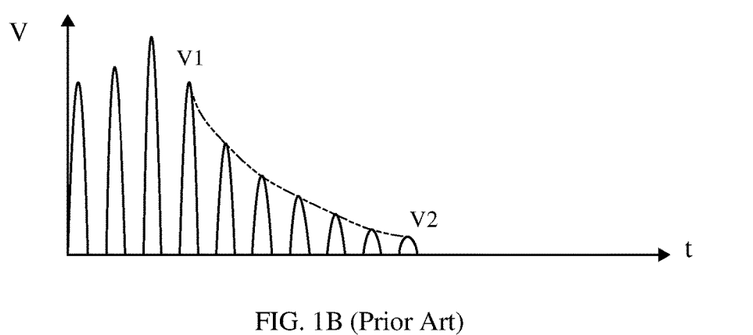
FIG. 1B is a schematic diagram illustrating an oscillation waveform of an oscillation circuit of a power transmitter resulted when there is a metal foreign object.

In existing wireless charging systems, Q factor is based in determining whether there is a foreign object (FO), e.g., a metal foreign object. The Q factor is a characteristic parameter of an oscillation circuit of the power transmitter. The value of Q factor resulted when there is a metal foreign object will be different from the value of Q factor resulted when there is no metal foreign object. Therefore, the Q factor can be based in determining whether there is a metal foreign object. FIG. 1A and FIG. 1B illustrate oscillation waveforms of the oscillation circuit of the power transmitter obtained when there is no metal foreign object and when there is a metal foreign object, respectively. As shown in FIG. 1A and FIG. 1B, when there is a metal foreign object, the amplitude of the oscillation waveform will drop rapidly, and the value of Q factor corresponding thereto will also be smaller than the value of Q factor resulted when there is no metal foreign object.

A conventional method to calculate the Q factor is to capture signal peaks V1 and V2 corresponding to two time points respectively and use the frequency of the captured signal to do calculations to obtain the value of Q factor. However, in this method, once the signal peak V1 or V2 is interfered by noise or a deviation on extracted values occurs, a distortion will be caused for the calculated value of Q factor, which may easily cause a misjudgment on the presence of a metal foreign object.

SUMMARY

The embodiments of the present application provide a detecting method and a power transmitter, which can effectively improve the accuracy of determining whether there is a foreign object or a power receiver approaching the power transmitter in a wireless charging system. The technical solutions provided in the present application are described below.

According to an aspect of embodiments of the present application, a detecting method is provided, for detecting whether there is a foreign object or a power receiver approaching a power transmitter in a wireless charging system, the method including: utilizing a signal sampling circuit to sample a signal generated by an oscillation circuit of the power transmitter; utilizing a control signal to obtain an oscillation waveform based on sampled values obtained by sampling the signal by the signal sampling circuit; utilizing the control circuit to perform an integral operation on the oscillation waveform and average the result of the integral operation to obtain an integrated average value; obtaining an oscillation frequency of the oscillation waveform; and determining whether the foreign object or the power receiver exists, based on the integrated average value and the oscillation frequency.

According to another aspect of embodiments of the present application, a power transmitter in a wireless charging system is provided, the power transmitter including: a signal sampling circuit, configured to sample a signal generated by an oscillation circuit of the power transmitter; and a control circuit, coupled to the signal sampling circuit, configured to: obtain an oscillation waveform based on sampled values obtained by sampling the signal by the signal sampling circuit; perform an integral operation on the oscillation waveform and average the result of the integral operation to obtain an integrated average value; obtain an oscillation frequency of the oscillation waveform; and determine whether there is a foreign object or a power receiver approaching the power transmitter, based on the integrated average value and the oscillation frequency.

The technical solutions provided in the embodiments of the present application may achieve beneficial effects as follows.

In the detecting method and the power transmitter of the embodiments of the present application, a damped oscillation waveform generated by the oscillation circuit of the power transmitter is sampled, an integral operation is performed on the sampled oscillation waveform to obtain the integrated average value, and an estimation is conducted to obtain the oscillation frequency of the oscillation waveform. Then, the integrated average value and the oscillation frequency are based in determining whether there is a foreign object or a power receiver approaching the power transmitter. Different from the conventional method, i.e., calculating a value of Q factor of the oscillation waveform, the present application can improve the conventional method in which the accuracy of the value of Q factor is affected by interference by noise or a deviation on extracted values, and this causes a problem in determining whether there is a foreign object approaching the power transmitter. The present application can effectively improve the accuracy of determining whether there is a foreign object or a power receiver approaching the power transmitter.

It should be appreciated that the above generic description and the following detailed description are merely for illustrating and interpreting the present application and the present application is not limited thereto.

BRIEF DESCRIPTION OF THE DRAWINGS

For explaining the technical solutions used in the embodiments of the present application more clearly, the figures to be used in describing the embodiments will be briefly introduced in the following. Obviously, the figures described below are only some of the embodiments of the present application, and those of ordinary skill in the art can further obtain other figures according to these figures without making any inventive effort.

DETAILED DESCRIPTION

The technical solutions in the embodiments of the present application will be clearly and completely described below with reference to the figures of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope sought to be protected in the present application.

Generally, a wireless charging system includes a power transmitter (or TX) and one or more power receivers (or RX). The power transmitter can be used to wirelessly supply power to the power receiver(s) to charge or power the power receiver(s). The concept of invention provided in this application is mainly for detecting whether there is a foreign object (FO) approaching the power transmitter (or TX) in the wireless charging system, for example, to determine if a foreign object is placed on or close to the power transmitter. The foreign object mentioned in the present application refers to an object made of or containing a metal material, or a composite material, a mixture and an alloy, etc., which will be affected by wirelessly-transmitted electromagnetic waves. The foreign object may also have a coil or may be a coil-like object. Utilizing the concept of invention provided in the present application, it is also possible to detect whether there is an RX placed on or close to the power transmitter. If a foreign object is detected, the power transmitter may not start power transmission or may stop supplying power. The power transmitter can also start power transmission when a power receiver is detected.

For an oscillation waveform generated by an oscillation circuit of the power transmitter, different from the traditional method, i.e., calculating a value of Q-factor of the oscillation waveform, in the embodiments of the present application, an integral operation and an average operation are performed on the oscillation waveform to obtain an integrated average value, and an estimation is conducted to obtain an oscillation frequency of the oscillation waveform. Then, based on the integrated average value and the oscillation frequency, it is achieved a determination on whether there is a foreign object or a power receiver approaching the power transmitter. In this way, the present application can improve the conventional method in which the accuracy of the value of Q factor is affected by interference by noise or a deviation on extracted values, and this causes a problem in determining whether there is a foreign object approaching the power transmitter.

Specifically, an embodiment of the present application provides a detecting method, which includes sampling a signal generated by an oscillation circuit of the power transmitter; obtaining an oscillation waveform based on sampled values obtained by sampling the signal by a signal sampling circuit; performing an integral operation on the oscillation waveform and averaging the result of the integral operation to obtain an integrated average value; obtaining an oscillation frequency of the oscillation waveform; and determining whether there is a foreign object or a power receiver approaching the power transmitter, based on the integrated average value and the oscillation frequency.

Specifically, an embodiment of the present application provides a power transmitter, which includes a signal sampling circuit, configured to sample a signal generated by an oscillation circuit of the power transmitter; and a control circuit, coupled to the signal sampling circuit, configured to: obtain an oscillation waveform based on sampled values obtained by sampling the signal by the signal sampling circuit; perform an integral operation on the oscillation waveform and average the result of the integral operation to obtain an integrated average value; obtain an oscillation frequency of the oscillation waveform; and determine whether there is a foreign object or a power receiver approaching the power transmitter, based on the integrated average value and the oscillation frequency.

Figure 2:
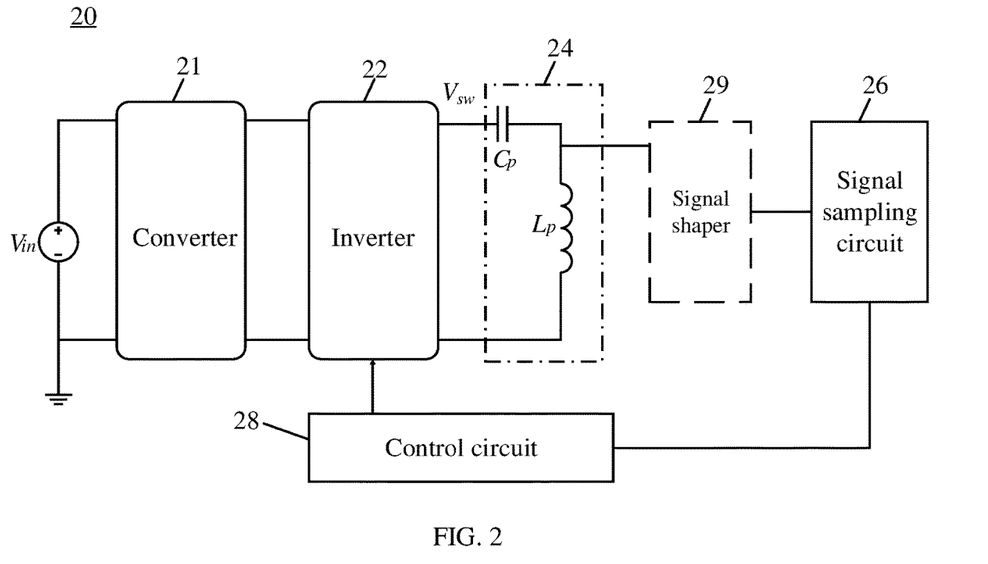
FIG. 2 is a schematic block diagram of a power transmitter according to an embodiment of the present application.

FIG. 2 is a schematic block diagram of a power transmitter 20 according to an embodiment of the present application. The power transmitter 20 includes a converter 21, an inverter 22, an oscillation circuit 24, a signal sampling circuit 26 and a control circuit 28 and optionally includes a signal shaper or proportional voltage divider 29. The converter 21, the inverter 22 and the oscillation circuit 24 are well known to a person of ordinary skill in the art. Therefore, a detailed description on these components is not necessary. The capturing of a damping oscillation waveform generated by the oscillation circuit 24 can be conducted at any node of a loop with the oscillation circuit 24 and is not limited to the node between a capacitor $C_p$ and an inductor $L_p$ shown in FIG. 2. The oscillation waveform captured by the signal sampling circuit 26 can be stored in a buffer (not shown) for later processing. The control circuit 28 processes the stored oscillation waveform data to obtain an integrated average value and an oscillation frequency. Based on the obtained integrated average value and the oscillation frequency, the control circuit 28 can make a decision as to whether there is a foreign object or a power receiver approaching the power transmitter 20.

The converter 21 can perform an appropriate voltage conversion on a direct-current (DC) input voltage $V_{in}$. The voltage or current output to a load (not shown, e.g., a power receiver) may mainly depend on the conversion conducted by the converter 21. The converter 21 may be a buck converter, which can output a suitable DC voltage to the inverter 22.

The inverter 22 is configured to convert the DC input voltage $V_{in}$ into an oscillated inverter output waveform ($V_{sw}$) for driving the oscillation circuit 24. For example, the inverter 22 may be a DC-to-AC full-bridge inverter with four transistors (not shown), or the inverter 22 may be implemented by a half-bridge inverter. The control circuit 28 can generate the inverter output waveform ($V_{sw}$) by controlling the switching of the transistors (not shown) in the inverter 22. The control circuit 28 can also control the inverter 22 to disconnect the inverter 22 from a power supply such that only the loop with the oscillation circuit 24 remains.

The oscillation circuit 24 includes a capacitor $C_p$ and an inductor $L_p$ that are connected in series with each other, but is not limited thereto. An oscillation circuit 24 consisting of two capacitors and one inductor or other types of oscillation circuits can also be used. In the wireless charging system, by a coupling between the inductor $L_p$ of the oscillation circuit 24 in the power transmitter 20 and an inductor (not shown) in a power receiver, electrical power is supplied from the power transmitter 20 to the power receiver.

If the inverter 22 persistently generates the inverter output waveform ($V_{sw}$), signal waveforms measured on the oscillation circuit 24 will be signal waveforms with a consistent peak voltage. If the inverter 22 is disconnected from a power supply, the energy stops being supplied, and the voltage amplitude of the signal waveforms measured on the oscillation circuit 24 will gradually decrease, resulting in a damped oscillation waveform.

If there is a foreign object approaching the power transmitter 20 at the time, the amplitude of the oscillation waveform measured on the oscillation circuit 24 will be attenuated significantly, and the voltage amplitude of the oscillation waveform will decrease rapidly. Therefore, a detection on the attenuation of the oscillation waveform can be conducted so as to determine whether there is a foreign object nearby. If there is a power receiver (RX) approaching the power transmitter 20 at the time, in addition to a change of the voltage amplitude of the oscillation waveform, the frequency of the oscillation waveform will also have a significant change. Therefore, a detection on the frequency of the oscillation waveform can also be conducted so as to determine whether there is an RX nearly.

The signal sampling circuit 26 may sample a signal (e.g., a voltage signal) generated by the oscillation circuit 24 of the power transmitter 20 to obtain sampled values. The above oscillation waveform is composed of these sampled values. The afore-mentioned signal sampling can be implemented by using a signal sampling circuit which is well known to a person of ordinary skill in the art. In order to detect whether there is a foreign object or a power receiver approaching the power transmitter, the time the signal sampling circuit 26 conducts the sampling may be after the signal generated by the oscillation circuit 24 begins to damp. For example, the inverter output waveform ($V_{sw}$) is persistently generated for a period of time, and right after that, the inverter 22 is disconnected from a power supply, and the signal generated by the oscillation circuit 24 is detected at the time.

The control circuit 28 can obtain the oscillation waveform based on the sampled values obtained by sampling the signal by the signal sampling circuit 26. The data sampled by the signal sampling circuit 26 may be stored in a buffer (not shown) in advance, and then the control circuit 28 reads the data from the buffer (not shown) to obtain the oscillation waveform. The control circuit 28 can analyze the oscillation waveform to obtain an integrated average value and an oscillation frequency corresponding to the oscillation waveform. Then, the control circuit 28 determines whether there is a foreign object or a power receiver approaching the power transmitter 20 based on the integrated average value and the oscillation frequency.

The control circuit 28 may analyze only an upper-half or a lower-half of the oscillation waveform to obtain the integrated average value and the oscillation frequency. Alternatively, the signal sampling circuit 26 may only sample an upper-half or a lower-half of the oscillation waveform and output the upper-half or the lower-half of the oscillation waveform to the control circuit 28 for later analysis.

Optionally, the power transmitter 20 may further include a signal shaper or a proportional voltage divider 29 for scaling down the signal generated by the oscillation circuit 24 in a certain proportion. The structure of the signal shaper 29 is well known to a person of ordinary skills in the art. If the amplitude (e.g., 100V) of the signal (e.g., voltage signal) generated by the oscillation circuit 24 is too large, the signal generated by the oscillation circuit 24 can be appropriately adjusted by using the signal shaper 29, and then the signal sampling circuit 26 performs the sampling on the adjusted signal. In this way, the requirements on signal processing capabilities of the signal sampling circuit 26 and the control circuit 28 can be effectively lowered.

The control circuit 28 may be a circuit with certain integration, which may include a control logic and a computing logic. The control logic can be used to control the actions of the inverter 22 and other electronic components of the power transmitter 20 and can also be used to control the entire charging process for a power receiver. The computing logic can be used to perform necessary processing or computations on the obtained data, and the results obtained by the computing logic can be fed back to the control logic such that the control logic can adjust the charging process.

The control circuit 28 may also include a signal processing logic, which may process the received signal in a certain level, for example, denoising, filtering or shaping of the signal. The signal sampling circuit 26 may also be integrated into the control circuit 28 as a part of the signal processing logic, thereby simplifying the entire circuit layout of the power transmitter 20. Of course, the control logic, the computing logic and/or the signal processing logic can constitute a generic control circuit 28, but these logics are dispersed in different electronic components.

In some embodiments, the detection on whether there is a foreign object or a power receiver approaching the power transmitter 20 can be conducted during a non-power-transmission period. For example, during the non-power-transmission period, it is possible to periodically detect at intervals whether a foreign object is approaching. If something detected to be approaching the power transmitter 20 is a foreign object, the power transmitter 20 may not start the charging process for a power receiver. If something detected to be approaching the power transmitter 20 is a power receiver, the power transmitter 20 may automatically try to charge the power receiver. Specifically, the oscillation circuit is fed with the inverter output waveform ($V_{sw}$) generated based on one or more pulse signals during a predetermined length of time in the non-power-transmission period, and the pulse signal(s) stops being fed at the end of the predetermined length of time. In detail, the control circuit 28 controls the inverter 22 to persistently output the pulse signal(s) within the predetermined length of time. After the predetermined length of time ends, the control circuit 28 disconnects the inverter 22 from a power supply. Furthermore, the signal sampling circuit 26 samples the signal generated by the oscillation circuit 24 during a period when transmission of the pulse signal(s) is stopped. That is, the signal sampling operation conducted by the signal sampling circuit 26 is performed after the inverter 22 is disconnected from the power supply. Further, the control circuit 28 obtains the oscillation waveform based on the sampled values obtained during the period when transmission of the pulse signal(s) is stopped. That is, the oscillation waveform obtained at the time is a damped oscillation waveform. Therefore, by analyzing the damped oscillation waveform during the non-power-transmission period, the control circuit 28 can detect whether there is a foreign object or a power receiver approaching the power transmitter 20.

In some embodiments, the control circuit 28 obtains the integrated average value and the oscillation frequency based on a scaled-down version of the oscillation waveform. For example, the signal generated by the oscillation circuit 24 can be scaled down in a certain proportion by the signal shaper 29 and then sampled by the signal sampling circuit 26; or the signal sampling circuit 26 can scale down the sampled signal in a certain proportion; or the control circuit 28 can scale down the sampled signal received from the signal sampling circuit 26 in a certain proportion.

In some embodiments, the control circuit 28 obtains the integrated average value and the oscillation frequency based on an upper-half or a lower-half of the oscillation waveform. Specifically, the control circuit 28 analyzes the entire oscillation waveform. Alternatively, the control circuit 28 can analyze only an upper-half or a lower-half of the oscillation waveform to obtain the integrated average value and the oscillation frequency. The analysis of a partial waveform can reduce the amount of required computations and increase the speed of detection.

Figure 3A:
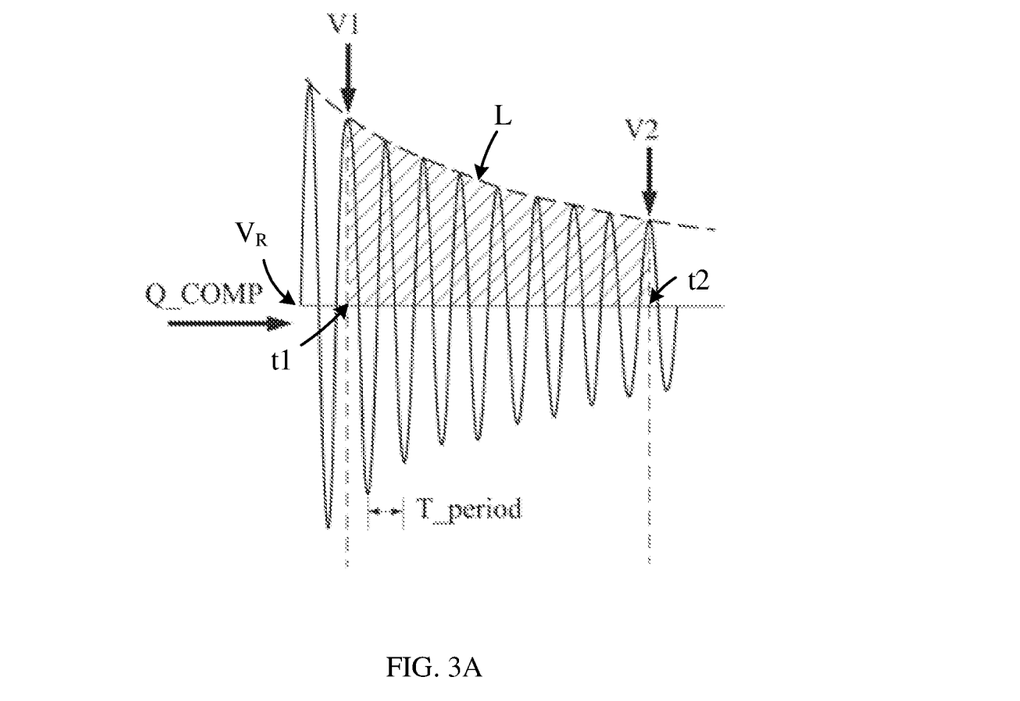
FIG. 3A is a schematic diagram illustrating an example of obtaining an integrated average value according to an embodiment of the present application.

In some embodiments, referring to FIG. 3A, the oscillation waveform is indicated by Q_COMP. The control circuit 28 can obtain the integrated average value by calculating an area between a peak curve L formed by a first signal peak value V1 corresponding to a first time point t1 in the oscillation waveform and a second signal peak V2 corresponding to a second time point t2 in the oscillation waveform and a reference voltage $V_R$. Specifically, the control circuit 28 obtains a first signal peak value V1 at a first time point t1 in the oscillation waveform; obtains a second signal peak value V2 at a second time point t2 in the oscillation waveform; obtains a peak curve L based on the first signal peak value V1 and the second signal peak value V2; and performs an integral operation based on the peak curve L and a reference voltage $V_R$, and averaging the result of the integral operation based on a difference between the first time point t1 and the second time point t2 to obtain the integrated average value. The peak curve L may be a curve fitted by the first signal peak value V1, the second signal peak value V2 and all of signal peak values between the first time point t1 and the second time point t2. After the peak curve L is obtained, the result obtained by performing the integral operation on the peak curve L can be represented by the area between the peak curve L and the reference voltage $V_R$. That is, the control circuit 28 obtains the area of a region between the peak curve L and the reference voltage $V_R$. After obtaining the integral result, the control circuit 28 averages the result based on time (that is, dividing the integral result by a difference between the first time point t1 and the second time point t2), thereby obtaining the integrated average value.

Figure 3B:
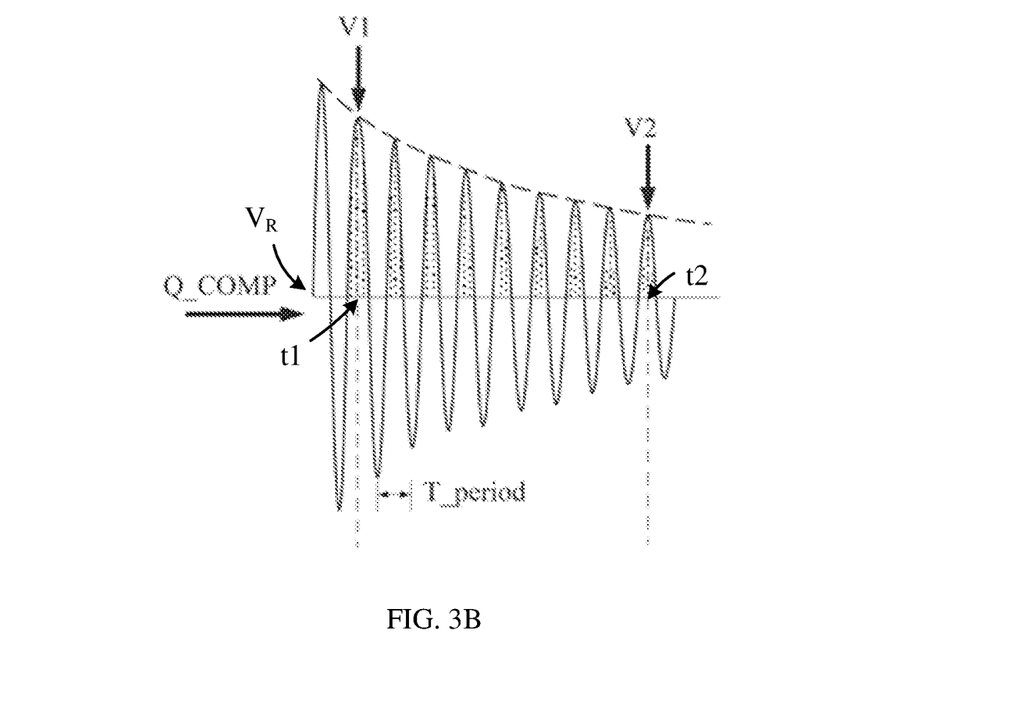
FIG. 3B is a schematic diagram illustrating another example of obtaining an integrated average value according to an embodiment of the present application.

In other embodiments, referring to FIG. 3B, the oscillation waveform is indicated by Q_COMP. The control circuit 28 can obtain the integrated average value by calculating an area between all signal waveforms between a first time point t1 and a second time point t2 in the oscillation waveform and a reference voltage $V_R$. Specifically, the control circuit 28 obtains a first time point t1 corresponding to a first signal peak value V1 in the oscillation waveform; obtains a second time point t2 corresponding to a second signal peak value V2 in the oscillation waveform; and performs an integral operation on all of signal waveforms between the first time point t1 and the second time point t2, and averages the result of the integral operation based on a difference between the first time point t1 and the second time point t2 to obtain the integrated average value. The control circuit 28 performs an integral operation on each of the signal waveforms between the first time point t1 and the second time point t2, obtains the area of a region between each signal waveform and the reference voltage $V_R$, and sums up the area of all the regions to obtain an integral result. The integral result is represented by a sum of areas between all of the signal waveforms between the first time point t1 and the second time point t2 and the reference voltage $V_R$. After obtaining the integral result, the control circuit 28 averages the result based on time (that is, dividing the integral result by a difference between the first time point t1 and the second time point t2), thereby obtaining the integrated average value.

The above integrated average value can represent a changing rate of voltage peak values (or an envelope of voltage signals) in the oscillation waveform and can represent the damping of the oscillation waveform. Therefore, it is suitable for being used to determine whether there is a foreign object or a power receiver approaching the power transmitter 20. Moreover, a use of the integrated average value can prevent the accuracy on determination from being affected by a deviation on extracted values of the signal peaks V1 and V2 or an interference with these values by noise.

Figure 3C:
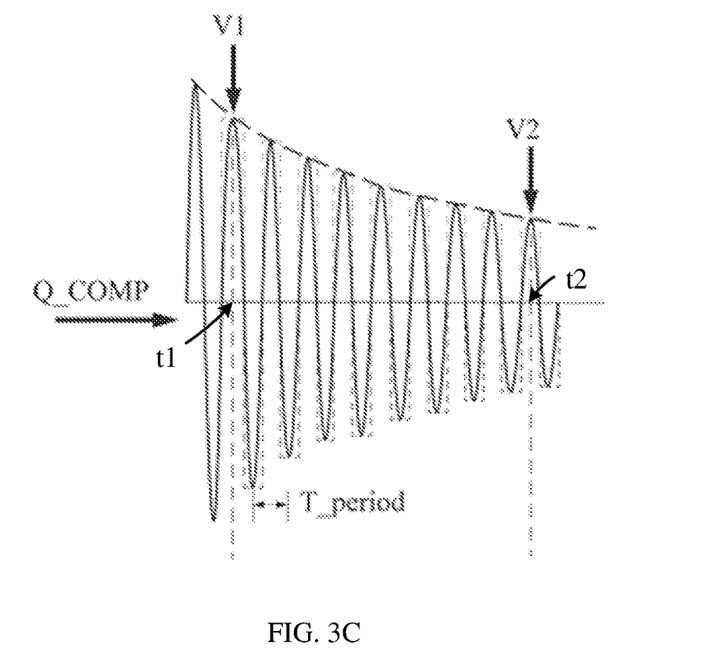
FIG. 3C is a schematic diagram illustrating an example of obtaining an oscillation frequency according to an embodiment of the present application.

In some embodiments, referring to FIG. 3C, the control circuit 28 can obtain the oscillation frequency T_period by calculating an average of time length occupied by all of signal waveforms between a first time point t1 and a second time point t2 in the oscillation waveform. Specifically, the control circuit 28 obtains a first time point t1 corresponding to a first signal peak value V1; obtains a second time point t2 corresponding to a second signal peak value V2; and sums the time occupied by each of signal waveforms between the first time point t1 and the second time point t2 and averages based on the sum, and converts the obtained result into a frequency to obtain the oscillation frequency. For example, it is assumed that the periods of signal waveforms between the first time point t1 and the second time point t2 are T1, T2, ..., T9, respectively. Then, it can be concluded that an averaged period T_avg of these 9 signal waveforms is (T1+T2+ ... T9)/9. Since the frequency is a reciprocal of the period, it can be obtained that the oscillation frequency is 1/T_avg.

Figure 4A:
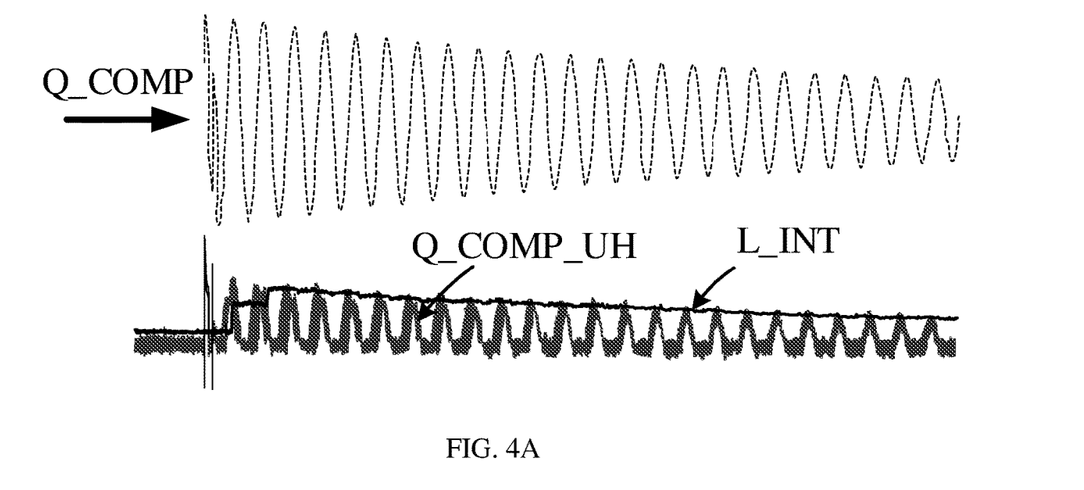
FIG. 4A is a schematic diagram illustrating a real-time result obtained by performing an integral operation on an oscillation waveform Q_COMP according to an embodiment of the present application.
Figure 4B:
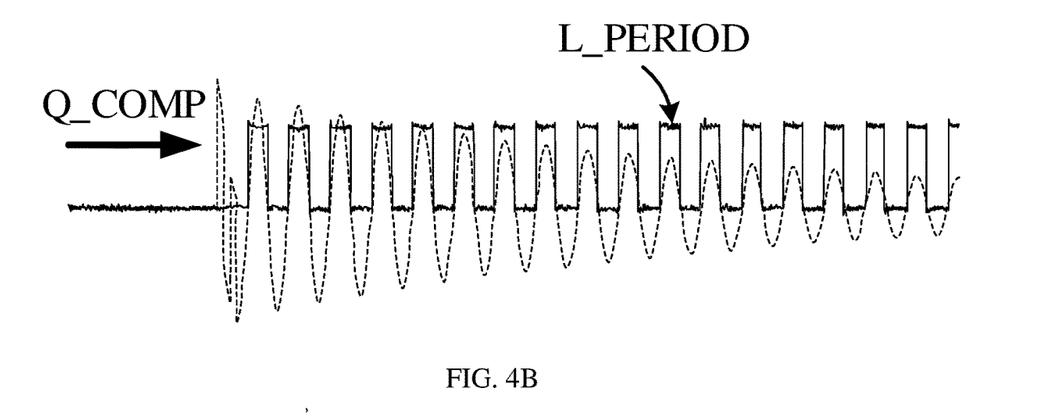
FIG. 4B is a schematic diagram illustrating an oscillation waveform Q_COMP and its corresponding extracted waveform of oscillation frequency L_PERIOD according to an embodiment of the present application.

Please refer to FIG. 4A. The originally obtained oscillation waveform Q_COMP (indicated by a dotted line) is shown by a waveform pattern at the top of FIG. 4A. The originally obtained oscillation waveform Q_COMP can be scaled in proportion and only an upper-half of the waveform is taken so as to obtain a waveform Q_COMP_UH at the bottom of FIG. 4A for the integral operation. Of course, it can also be taken only a lower-half of the waveform for the integral operation. The real-time result of the integral operation is shown by a curve L_INT at the bottom of FIG. 4A. Although a real-time integral operation is not necessary, the real-time integral results can also be used to carry out a real-time judgment on whether there is a foreign object or a power receiver nearby. Please refer to FIG. 4B. In terms of obtaining the oscillation frequency, the oscillation waveform Q_COMP (indicated by a dotted line) can be processed to obtain a corresponding oscillation frequency extracted waveform L_PERIOD. The oscillation frequency extracted waveform L_PERIOD can be a square wave, and its period is basically consistent with the period of the oscillation waveform Q_COMP. The frequency calculated from the square wave can be used to represent the oscillation frequency of the oscillation waveform Q_COMP.

The control circuit 28 of the power transmitter 20 determines whether there is a foreign object or a power receiver approaching the power transmitter 20 (e.g., whether there is a foreign object or a power receiver placed on or nearby the power transmitter 20) based on the integrated average value and the oscillation frequency. In detail, the control circuit 28 may compare the integrated average value with at least a first threshold and compare the oscillation frequency with at least a second threshold to determine whether the foreign object or the power receiver exists. The first threshold and the second threshold may be determined based on an integrated average value and an oscillation frequency of an oscillation waveform resulted when there is no foreign object and power receiver (RX) placed nearby, respectively. These thresholds may also be set based on empirical values obtained from experiments. For example, if the integrated average value calculated from a measured oscillation waveform falls in a first threshold range (which may at least include the first threshold), it can be determined that there is a foreign object or a power receiver approaching the power transmitter 20. If the oscillation frequency estimated from a measured oscillation waveform does not fall in a second threshold range (which may at least include the second threshold), that is, the oscillation frequency does not change significantly, it can be determined that the object approaching the power transmitter 20 is a foreign object; and if the oscillation frequency estimated from a measured oscillation waveform falls in the second threshold range, that is, the oscillation frequency changes significantly, it can be further determined that the object approaching the power transmitter 20 is a power receiver.

Therefore, the power transmitter 20 in the embodiments of the present application can detect whether there is a foreign object and/or a power receiver nearby and make a corresponding response based on the result of detection. For example, as long as a foreign object is detected, power supplying can be stopped or the charging process is not activated. When a power receiver is detected, it can try to start supplying power to the power receiver or send a relevant message in order to prepare to charge the power receiver.

Figure 5:
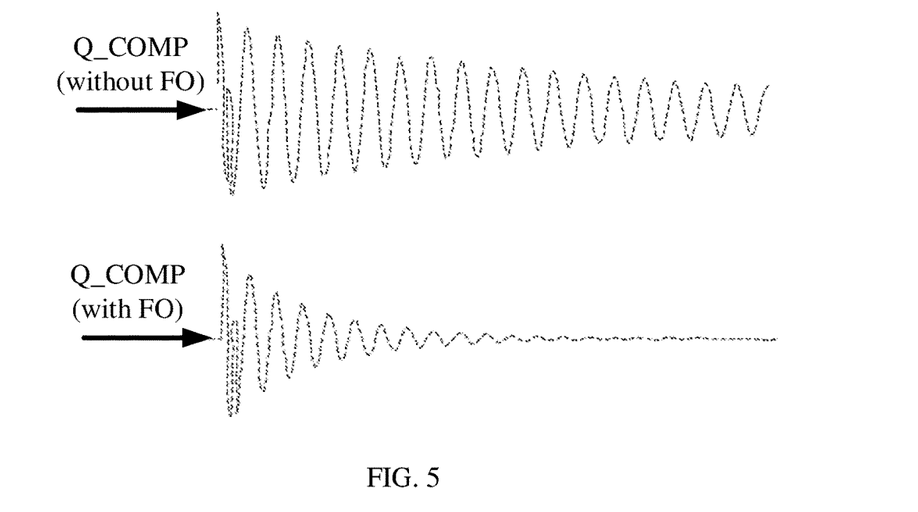
FIG. 5 is a diagram illustrating a comparison of oscillation waveforms resulted when there is a foreign object and when there is no foreign object according to an embodiment of the present application.

As shown in FIG. 5, when there is a foreign object (e.g., a coin) approaching the power transmitter 20, the amplitude of the oscillation waveform will be attenuated significantly, and its attenuation will be significantly greater than that of the oscillation waveform resulted when there is no foreign object nearby.

Figure 6:
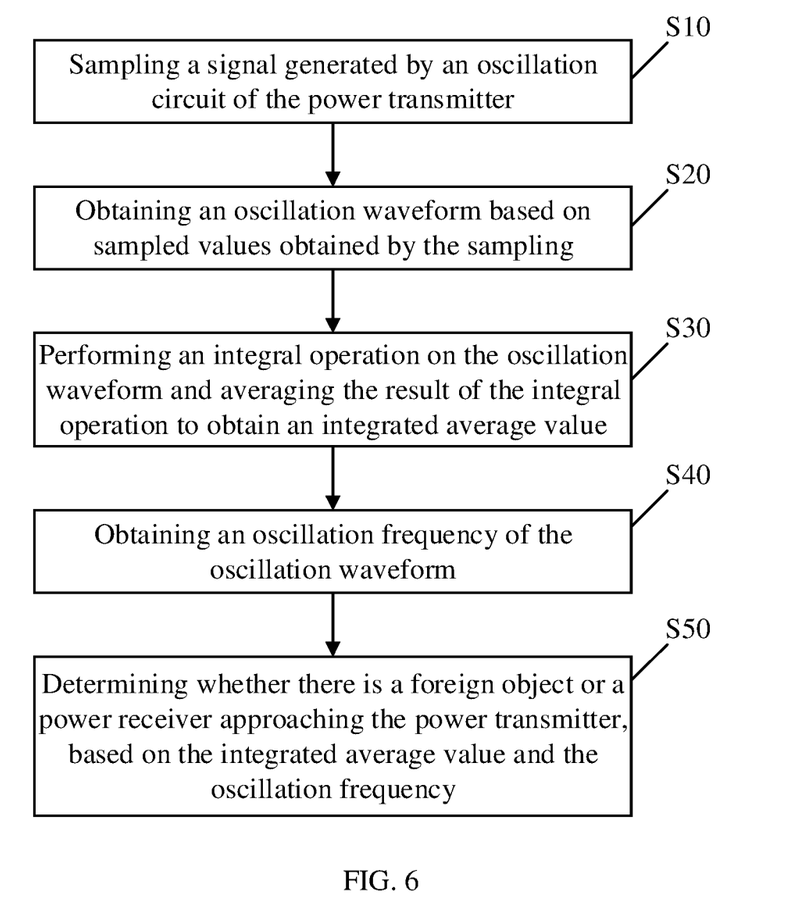
FIG. 6 is a flowchart of a detecting method according to an embodiment of the present application.

FIG. 6 is a flowchart of a detecting method according to an embodiment of the present application. Please refer to FIG. 2 and FIG. 6. The detecting method in the embodiment of the present application includes the following steps:

Step S10: sampling a signal (e.g., voltage signal) generated by an oscillation circuit of the power transmitter. Specifically, the control circuit 28 can control the inverter 22 to persistently generate the inverter output waveform ($V_{sw}$) for a predetermined length of time, and then disconnect the inverter 22 from a power supply at the end of the predetermined length of time. The signal sampling circuit 26 samples the signal generated at the time by the oscillation circuit 24.

Step S20: obtaining an oscillation waveform based on sampled values obtained by the sampling. The sampled values obtained by the signal sampling circuit 26 can be sent to the control circuit 28, or the sampled values can be stored in a buffer (not shown) and then the control circuit 28 reads the stored sampled values from the buffer (not shown) to obtain an oscillation waveform. This oscillation waveform is a damping oscillation waveform.

Step S30: performing an integral operation on the oscillation waveform and averaging the result of the integral operation to obtain an integrated average value. In an embodiment, referring to FIG. 3A, the control circuit 28 can obtain an integral result by calculating an area between a peak curve L formed by a first signal peak value V1 corresponding to a first time point t1 in the oscillation waveform and a second signal peak V2 corresponding to a second time point t2 in the oscillation waveform and a reference voltage $V_R$, and the integral result is averaged based on time to obtain the integrated average value. In another embodiment, referring to FIG. 3B, the control circuit 28 may obtain an integral result by calculating an area between all signal waveforms between a first time point t1 and a second time point t2 in the oscillation waveform and a reference voltage $V_R$, and the integral result is averaged based on time to obtain the integrated average value.

Step S40: obtaining an oscillation frequency of the oscillation waveform. Referring to FIG. 3C, the control circuit 28 can obtain the oscillation frequency by calculating the time length occupied by all of signal waveforms between a first time point t1 and a second time point t2 in the oscillation waveform.

Step S50: determining whether there is a foreign object or a power receiver approaching the power transmitter 20, based on the integrated average value and the oscillation frequency. The control circuit 28 may compare the integrated average value with at least a first threshold and compare the oscillation frequency with at least a second threshold to determine whether there is a foreign object or a power receiver approaching the power transmitter 20. For example, it is possible to determine whether a foreign object or a power receiver exists based on whether the integrated average value falls in a first threshold range. If the integrated average value is determined to fall in the first threshold range, it is possible to further determine whether the oscillation frequency falls in a second threshold range to determine if the object approaching the power transmitter 20 is a foreign object or a power receiver.

In the detecting method and the power transmitter of the embodiments of the present application, a damped oscillation waveform generated by the oscillation circuit of the power transmitter is sampled, an integral operation is performed on the sampled oscillation waveform to obtain the integrated average value, and an estimation is conducted to obtain the oscillation frequency of the oscillation waveform.

Then, the integrated average value and the oscillation frequency are based in determining whether there is a foreign object or a power receiver approaching the power transmitter. Different from the conventional method, i.e., calculating a value of Q factor of the oscillation waveform, the present application can improve the conventional method in which the accuracy of the value of Q factor is affected by interference by noise or a deviation on extracted values, and this causes a problem in determining whether there is a foreign object approaching the power transmitter. The present application can effectively improve the accuracy of determining whether there is a foreign object or a power receiver approaching the power transmitter.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

What is claimed is:

1. A detecting method, for detecting whether there is a foreign object or a power receiver approaching a power transmitter in a wireless charging system, the method comprising:
    utilizing a signal sampling circuit to sample a signal generated by an oscillation circuit of the power transmitter;
    utilizing a control signal to obtain an oscillation waveform based on sampled values obtained by sampling the signal by the signal sampling circuit;
    utilizing the control circuit to perform an integral operation on the oscillation waveform and average the result of the integral operation to obtain an integrated average value;
    obtaining an oscillation frequency of the oscillation waveform; and
    determining whether the foreign object or the power receiver exists, based on the integrated average value and the oscillation frequency.

2. The detecting method of claim 1, wherein the step of obtaining the integrated average value comprises:
    obtaining a first signal peak value at a first time point in the oscillation waveform;
    obtaining a second signal peak value at a second time point in the oscillation waveform;
    obtaining a peak curve based on the first signal peak value and the second signal peak value; and
    performing the integral operation based on the peak curve and a reference voltage, and averaging the result of the integral operation based on a difference between the first time point and the second time point to obtain the integrated average value.

3. The detecting method of claim 2, wherein the result of the integral operation is represented by an area between the peak curve and the reference voltage.

4. The detecting method of claim 1, wherein the step of obtaining the integrated average value comprises:
    obtaining a first time point corresponding to a first signal peak value;
    obtaining a second time point corresponding to a second signal peak value; and
    performing the integral operation on all of signal waveforms between the first time point and the second time point, and averaging the result of the integral operation based on a difference between the first time point and the second time point to obtain the integrated average value.

5. The detecting method of claim 4, wherein the result of the integral operation is represented by a sum of areas between all of the signal waveforms between the first time point and the second time point and a reference voltage.

6. The detecting method of claim 1, wherein the step of obtaining the oscillation frequency comprises:
    obtaining a first time point corresponding to a first signal peak value;
    obtaining a second time point corresponding to a second signal peak value; and
    summing the time occupied by each of signal waveforms between the first time point and the second time point and averaging based on the sum, and converting the obtained result into a frequency to obtain the oscillation frequency.

7. The detecting method of claim 1, wherein the step of determining whether the foreign object or the power receiver exists comprises:
    comparing the integrated average value with at least a first threshold and comparing the oscillation frequency with at least a second threshold to determine whether the foreign object or the power receiver exists.

8. The detecting method of claim 1, wherein the control circuit obtains the integrated average value and the oscillation frequency based on a scaled-down version of the oscillation waveform.

9. The detecting method of claim 1, wherein the control circuit obtains the integrated average value and the oscillation frequency based on an upper-half or a lower-half of the oscillation waveform.

10. The detecting method of claim 1, further comprising:
    feeding a pulse signal generated based on one or more pulse periods to the oscillation circuit during a predetermined length of time in a non-power-transmission period,
    wherein the step of sampling the signal generated by the oscillation circuit of the power transmitter comprises:
    sampling the signal generated by the oscillation circuit during a period when transmission of the pulse signal is stopped,
    wherein the step of obtaining the oscillation waveform comprises:
    obtaining the oscillation waveform based on the sampled values obtained during the period when transmission of the pulse signal is stopped.

11. A power transmitter in a wireless charging system, comprising:
    a signal sampling circuit, configured to sample a signal generated by an oscillation circuit of the power transmitter; and
    a control circuit, coupled to the signal sampling circuit, configured to:
    obtain an oscillation waveform based on sampled values obtained by sampling the signal by the signal sampling circuit;
    perform an integral operation on the oscillation waveform and average the result of the integral operation to obtain an integrated average value;
    obtain an oscillation frequency of the oscillation waveform; and determine whether there is a foreign object or a power receiver approaching the power transmitter, based on the integrated average value and the oscillation frequency.

12. The power transmitter of claim 11, wherein the control circuit is configured to:
- obtain a first signal peak value at a first time point in the oscillation waveform;
- obtain a second signal peak value at a second time point in the oscillation waveform;
- obtain a peak curve based on the first signal peak value and the second signal peak value; and
- perform the integral operation based on the peak curve and a reference voltage, and average the result of the integral operation based on a difference between the first time point and the second time point to obtain the integrated average value.

13. The power transmitter of claim 12, wherein the result of the integral operation is represented by an area between the peak curve and the reference voltage.

14. The power transmitter of claim 11, wherein the control circuit is configured to:
- obtain a first time point corresponding to a first signal peak value;
- obtain a second time point corresponding to a second signal peak value; and
- perform the integral operation on all of signal waveforms between the first time point and the second time point, and average the result of the integral operation based on a difference between the first time point and the second time point to obtain the integrated average value.

15. The power transmitter of claim 14, wherein the result of the integral operation is represented by a sum of areas between all of the signal waveforms between the first time point and the second time point and a reference voltage.

16. The power transmitter of claim 11, wherein the control circuit is configured to:
- obtain a first time point corresponding to a first signal peak value;
- obtain a second time point corresponding to a second signal peak value; and
- sum the time occupied by each of signal waveforms between the first time point and the second time point and average based on the sum, and convert the obtained result into a frequency to obtain the oscillation frequency.

17. The power transmitter of claim 11, wherein the control circuit is configured to:
- compare the integrated average value with at least a first threshold and compare the oscillation frequency with at least a second threshold to determine whether there is the foreign object or the power receiver approaching the power transmitter.

18. The power transmitter of claim 11, wherein the control circuit obtains the integrated average value and the oscillation frequency based on a scaled-down version of the oscillation waveform.

19. The power transmitter of claim 11, wherein the control circuit obtains the integrated average value and the oscillation frequency based on an upper-half or a lower-half of the oscillation waveform.

20. The power transmitter of claim 11, wherein:
- the oscillation circuit is configured to be fed with a pulse signal generated based on one or more pulse periods during a predetermined length of time in a non-power-transmission period;
- the signal sampling circuit is configured to sample the signal generated by the oscillation circuit during a period when transmission of the pulse signal is stopped; and
- the control circuit is configured to obtain the oscillation waveform based on the sampled values obtained during the period when transmission of the pulse signal is stopped.

* * * * *